United States Patent [19]

Bethea et al.

[11] 4,356,286

[45] Oct. 26, 1982

[54] THERMOPLASTIC ELASTOMER BLENDS OF A NITRILE RUBBER AND A CRYSTALLINE POLYAMIDE MIXTURE

[75] Inventors: Tristram W. Bethea, Akron; Shingo Futamura, Wadsworth, both of Ohio

[73] Assignee: The Firestone Tire & Rubber Company, Akron, Ohio

[21] Appl. No.: 246,838

[22] Filed: Mar. 23, 1981

[51] Int. Cl.³ .............................................. C08L 77/00
[52] U.S. Cl. ..................................... 525/183; 525/184
[58] Field of Search ................................ 525/183, 184

[56] References Cited

U.S. PATENT DOCUMENTS

| | | | |
|---|---|---|---|
| 2,683,697 | 7/1954 | Newell | 525/184 |
| 2,795,524 | 6/1957 | Rodman | 525/184 |
| 3,218,371 | 11/1965 | Grabowski | 260/857 |
| 3,468,974 | 9/1969 | Elgin | 525/184 |
| 3,491,034 | 1/1970 | Seelig | 525/184 |
| 3,658,752 | 4/1972 | Mogadore | 260/41.5 A |
| 3,701,702 | 10/1972 | Schichman | 525/184 |
| 3,965,055 | 6/1976 | Schichman | 260/3 |
| 4,197,379 | 4/1980 | Coran | 260/845 |
| 4,321,336 | 3/1982 | Meyer | 525/183 |

FOREIGN PATENT DOCUMENTS

| | | | |
|---|---|---|---|
| 7708136 | 3/1977 | Netherlands | 525/184 |
| 866479 | 4/1961 | United Kingdom . | |
| 1190049 | 4/1970 | United Kingdom . | |
| 1518639 | 7/1978 | United Kingdom . | |

OTHER PUBLICATIONS

F. S. Tolstukhina et al., Proprietes De Vulcanisats etc.: R.G.C.P., vol. 48, No. 11, (1971), pp. 1239–1242.
Emich: Alien Custodian Property; Published 04/20/43.

*Primary Examiner*—Paul Lieberman

[57] ABSTRACT

Our invention is directed to a process for producing processable thermoplastic elastomer blends of nitrile rubber with a crystalline polyamide mixture of at least two polyamides at a temperature below the melting temperature of the highest melting polyamide, but above the melting point of the lowest melting polyamide. The amount of nitrile rubber ranges from about 20 to about 80 percent by weight with the polyamides ranging from about 80 to about 20 percent by weight. Although processed at a temperature below the melting point of the highest melting polyamide, usually present in a substantial amount, the compounds surprisingly were readily mixed with the blends being smooth with no loose or fibrous material therein.

6 Claims, No Drawings

THERMOPLASTIC ELASTOMER BLENDS OF A NITRILE RUBBER AND A CRYSTALLINE POLYAMIDE MIXTURE

BACKGROUND OF THE INVENTION AND PRIOR ART

Blends of elastomers and crystalline plastics, which give thermoplastic elastomers, are well known to the industry. Typical examples of such blends previously reported include: butyl rubber/polyethylene, SBR/polypropylene, polybutadiene/polypropylene, EPDM/polypropylene. Blends containing butadiene-acrylonitrile copolymer generally also contain PVC; this blend is usually leathery. Blends can be made by mixing the components on a mill, in a Banbury mixer, in a Brabender mixer, or in a single- or twin-screw extruder.

British Pat. No. 866,479 relates to blends of natural and synthetic rubbers including acrylonitrile/butadiene copolymers having a polyamide therein with the blending carried out at a temperature above the melting point of the polyamide. Additionally, sulfur is added to vulcanize the rubber.

British Pat. No. 1,190,049 relates to thermoplastic molding materials such as diene polymers or copolymers which are blended with a polyamide and with a metal salt. The molding materials may also contain vulcanizing agents and fillers.

British Pat. No. 1,518,639 relates to blends of polyamide resins and crosslinked rubbers wherein the crosslinking formation is carried out at a temperature at or above the melting point of the polyamide to the decomposition temperature of the rubber.

U.S. Pat. No. 3,218,371 relates to a blend of (a) a polymerized epsilon caprolactam, (b) a copolymer of butadiene and acrylonitrile, and (c) a copolymer of styrene and acrylonitrile wherein the blending must occur at a temperature above the melting point of the polyamide.

U.S. Pat. No. 3,658,752 relates to blends of an elastomer with an incompatible thermoplastic wherein the materials are blended at a temperature above the softening point of the thermoplastic and below the degradation temperature of the elastomer.

U.S. Pat. No. 3,965,055 relates to a vulcanizable rubber which is modified by the addition of a resin at a temperature above the melting point of the resin. Particular emphasis is placed with regard to the size and shape of the resin.

U.S. Pat. No. 4,173,556 is directed to thermoplastic elastomeric blends of polyamide and cross-linked rubber; an inert plasticizer is used when the amount of polyamide exceeds the amount of rubber.

U.S. Pat. No. 4,197,379 is a continuation-in-part of U.S. Pat. No. 4,173,556, above cited, and is directed to the composition of U.S. Pat. No. 4,173,556 as modified by reaction with a dimethylol phenolic compound as plasticizer.

An article published in Revue Generale des Caoutchoucs et Plastiques (RCPLA5) Vol. 48, p. 1239 (1971) by F. S. Tolstukhina and N. N. Kolesnikova in 1971, related to properties of vulcanizates based on blends of nitrile rubber and polyamide wherein the processing temperature is 20° to 30° C. above the melting point of the nylon.

SUMMARY OF THE INVENTION

The present invention relates to a process wherein a nitrile rubber is mixed with at least two crystalline polyamides at a temperature which is below the melting point of at least one amide and surprisingly yields (without any vulcanization) a thermoplastic elastomer which has good physical properties. The present invention constitutes a clearly unexpected result based upon the fact that when a single polyamide is utilized, a mixing temperature above the melting point of the polyamide is required.

Our invention provides a process for blending a nitrile rubber with at least two different types of polyamides to produce a thermoplastic elastomer wherein the blending temperature is below at least the melting point of the highest melting polyamide; said thermoplastic elastomer is recycleable and reprocessable.

In general, our process for preparing blends of a nitrile rubber and a plurality of polyamides comprises the steps of: obtaining a nitrile rubber, the amount of nitrile component in said nitrile rubber ranging from about 10 percent to about 60 percent by weight, said nitrile component being derived from monomers selected from the group consisting of acrylonitrile, methacrylonitrile, vinylidene cyanide, and fumaronitrile, the diene component of said nitrile rubber being derived from monomers selected from the group consisting of (1) conjugated dienes having from 4 to 10 carbon atoms, (2) at least two conjugated dienes having from 4 to 10 carbons, (3) chloroprene, (4) vinyl substituted aromatic compounds having from 7 to 12 carbon atoms and (a) conjugated dienes having from 4 to 10 carbon atoms or (b) chloroprene, and combinations thereof; adding a first polyamide having a high melting point; and adding at least a second polyamide having a lower melting point than said first polyamide, the total amount of polyamide mixture ranging from about 80 percent to about 20 percent by weight based upon said nitrile rubber and the total weight of said polyamide mixture; mixing and heating said nitrile rubber and said polyamide mixture at a temperature below the melting point of first said polyamide having the higher melting point to produce a processable thermoplastic elastomer blend. In general, the sequence of addition is not critical.

PREFERRED EMBODIMENTS OF THE INVENTION

According to our invention, blends of nitrile rubber and a plurality of polyamides are mixed or processed at a temperature below the melting point of the highest melting polyamide. This discovery is quite surprising in that nitrile rubber polyamide blends containing a single polyamide nylon polymer are not processable at temperatures below the melting point of the polyamide.

When a mixing temperature greater than the melting point of the Nylon 6 was used, discoloration and eventually charring of the nitrile rubber resulted-particularly in mixing on a mill or in a Brabender mixer.

The nitrile portion of the nitrile rubber can be made from monomers of acrylonitrile, methacrylonitrile, vinylidene cyanide, and fumaronitrile. The amount of the monomer containing the nitrile group, by weight of the nitrile rubber, generally ranges from about 10 percent to about 60 percent, desirably from about 15 percent to about 50 percent, and preferably from about 25 percent to about 35 percent. Generally, amounts of nitrile component on the lower end of a particular range results in a softer product with amounts of the high end range resulting in a harder final product. Of course, amounts of nitrile component below the broad range generally result in a final product simply being too soft to have any good physical properties, whereas amounts in excess of 60 percent generally result in too hard of a thermoplastic elastomer blend.

The diene component of the nitrile rubber can be made from any conjugated diene having from 4 to about 10 carbon atoms, chloroprene, and copolymers made from said conjugated diene or said chloroprene with a vinyl substituted aromatic compound containing from 7 to 12 carbon atoms. Examples of specific conjugated dienes include butadiene, isoprene, 2,3-dimethyl-1, 3-butadiene, 2-methyl-1, 3-pentadiene, 3,4-dimethyl-1, 3-hexadiene, 4,5-diethyl-1,3-octadiene, pentylidene, hexadiene, heptadiene, octadiene and the like. Preferred examples of conjugated dienes include butadiene and isoprene. Naturally, copolymers or interpolymers of various conjugated dienes with themselves can be utilized such as butadiene-piperylene. Examples of specific aromatic compounds include 3-methylstyrene vinyltoluene, alphamethylstyrene, 4-n-propylstyrene, 4-t-butylstyrene, 4-dodecylstyrene, 4-cyclohexylstyrene, 2-ethyl-4-benzyl-styrene, 4-methoxystyrene, 4-dimethyl-aminostyrene, 3,5-diphenoxystyrene, 4-p-tolylstyrene, 4-phenylstyrene, 4,5-dimethyl-1-vinylnaphthalene, 3-n-propyl-2-vinylnaphthalene, and the like. Alphamethylstyrene is desirable with styrene being highly desirable. Any conventional rubber, including commercially available nitrile rubber, can be used.

The thermoplastic elastomer blends of the present invention generally contain from about 20 percent to about 80 percent by weight of a nitrile-rubber based upon the total weight of said nitrile-rubber and the polyamide mixture. A desirable amount of nitrile rubber is from about 50 percent to about 75 percent by weight, with a preferred amount being from about 60 percent to about 70 percent by weight. Approximately 65 percent by weight of nitrile rubber is considered an optimum amount.

The polyamide portion of the blend can be made from any conventional or commercial polyamide having a weight average molecular weight of from about 1,000 to about 100,000 and preferably from about 5,000 to about 30,000. In accordance with the present invention, it is critical that at least two different types of crystalline polyamide be utilized. By types of polyamide, it is meant that generally two different polyamides be utilized having different melting points although the definition is meant to include a single type of polyamide, for example, Nylon-6, wherein two different components of widely varying molecular weights are utilized and thus has two different melting points. Examples of specific polyamides include Nylon-6-6, that is poly(hexamethylene adipamide); Nylon-6, that is poly-E-caprolactam; Nylon-11, that is poly(W-aminoundecanoic acid); and the like. Additionally, copolyamides can be utilized as one of the at least two types of polyamide utilized, such as a polycaprolactam type polyamide copolymer having a melting point of approximately 142° C., e.g., Zytel-63 manufactured by DuPont. Specific types of polyamide components having different melting temperatures of the nylon portion of the blend include Nylon-12 and Nylon-6, Nylon-12 and Nylon-6-6, Nylon-11 and Nylon-6, and a polycaprolactam copolymer and Nylon-6-6. Mixtures of nitrile rubber and two or more different types of polyamides such as those set forth above have unexpectedly been found to be readily processable simply by heating to a temperature between the melting point of a lower melting temperature polyamide and the highest melting temperature polyamide. That is not to say that one polyamide must possess a so-called high melting temperature, since in fact they can be both of low melting temperatures so long as there is a difference in the melting point of the two or more polyamide-type polymers and the processing or blending temperature is below the higher melting point polyamide. Although the melting point for specific combinations will vary within a range between the high melting polyamide and the low melting polyamide, generally a temperature of at least 5° C. below the melting point of the highest melting nylon and preferably at least 20° C. below the melting point of the highest melting polyamide is utilized. The weight percent of the highest melting polyamide to the total weight of the polyamides is generally at least 15 percent by weight, desirably at least 40 percent by weight and preferably at least 50 percent by weight.

At least two different types of crystalline polyamide can be mixed with the nitrile rubber in any conventional manner and method such as a two roll mill, a Brabender mixer, and the like. A very efficient method of mixing has been found to be a conventional double screw extruder wherein the final mixing temperature is between the melting point of the high melting polyamide and the lower temperature melting polyamide.

An additional aspect of the present invention is that the utilization of a high molecular weight plasticizer, such as the polyesters, has been found desirous in improving the physical properties of the processed blend, especially the low temperature flex. By high molecular weight it is meant a molecular weight of at least 1,000 and desirably from about 2,000 to about 4,000. A specific example that can be utilized includes Plastoline 9780 manufactured by Emery Industries of Cincinnati, Ohio, and is a polyester oligomer having a molecular weight of between 2,000 and 3,000.

As previously noted, it has been unexpectedly found that although a single type polyamide cannot be blended with a nitrile rubber at a temperature below the melting point of said specific type polyamide when two different types of polyamides are utilized and mixed at a melting point between the two, a synergistic result is obtained in that a processable blend or a thermoplastic elastomer is produced which has no fibrous or loose material therein. Moreover, the blend has good physical properties. For example, blends of the present invention have good tensile strength, high modulus properties, good oil resistance, solvent resistance, low temperature flexibility, good adhesion to urethane paints, and high dielectric constants. Additionally, the blends of the present invention are complete in and of themselves. Thus, they do not require any vulcanization whatsoever to improve the physical properties. In fact, vulcanization will at times actually result in reduction of the physical properties. Furthermore, the blends do not require any common or conventional additives or fillers normally required by elastomers such as carbon black, silica, clay, and the like. Another aspect of the blends is that they are readily reprocessable, that is, they can readily be recycled by grinding and heating.

The thermoplastic elastomer blends of the present invention can be utilized in bumper side strips on automobiles, various automotive parts, and the like.

The invention will be better understood by reference to the following examples:

EXAMPLE I

In the following formulations, the blend was made as follows:

The nitrile rubber was cryogenically ground in a Wiley mill using dry ice as a coolant, and the various polyamides were added by mixing. Generally, the polyamides were obtained in the form of small chips and mixed well with the nitrile rubber. The physical mixture was then fed to a twin screw extruder at approximately the temperature indicated and extruded using RPM's routinely selected for each formulation. As the material was extruded, it was first fed into a coolant water bath and then to a chopper where it was diced.

Examples of some of the blends are set forth in Table I.

FR-N 512 is a butadiene/acrylonitrile copolymer having a 32 percent by weight content of acrylonitrile. The material contained a non-staining stabilizer and a "high" amount of gel. This copolymer was manufactured by The Firestone Tire & Rubber Company.

TABLE I

| INGREDIENT | A | B | C | D |
|---|---|---|---|---|
| FR-N 512 | 650g | 650g | 650g | 600g |
| Nylon-12 | 50g | 100g | 0g | 200g |
| Nylon-6 | 300g | 250g | 350g | 200g |
| Plastoline 9780 | 97.5g | 97.5g | 97.5g | 120g |

Each of the preceeding formulations was mixed in a twin screw extruder operating at 200°–215° C. It should be noted that the melting temperature cited in formulations A, B, and D containing two different types of polyamides were readily blended and were smooth in coming out of the blending extruder. This was true even in formulations A and B which contained a very high amount of the highest melting point polyamide. However, formulation C which contained Nylon-6 as the only polyamide was processed at a temperature below its melting point and was not smooth coming out of the extruder and had much loose and fibrous material in it. Generally, formulations A, B and D were strong, whereas formulation C was weak and could be readily pulled apart. Thus, the results were quite surprising in that mixtures of the polyamides blended below the melting point of one of the polyamides were readily blended and had good properties. Formulations A, B and D can readily be formulated into articles of desired shape by conventional injection molding techniques.

The melting points for specific representative polyamides that can be utilized in the practice of our invention include: Nylon-6, m.p. 225° C.; Nylon-6-6, m.p. 264° C.; Nylon-6,10, m.p. 222° C.; Nylon-11, m.p. 185° C.; and, Nylon-12, m.p. 180° C.

While our invention has been described in detail setting forth the preferred embodiments as well as the best mode, in accordance with the patent statutes, it is to be understood that the scope of our invention is measured by the appended claims.

What is claimed is:

1. A process for preparing blends of a nitrile rubber and a crystalline polyamide mixture, comprising the steps of:
    obtaining a nitrile rubber, the amount of nitrile component in said nitrile rubber ranging from about 10 percent to about 60 percent by weight, said nitrile component being derived from monomers selected from the group consisting of acrylonitrile, methacrylonitrile, vinylidene cyanide, and fumaronitrile, the diene component of said nitrile rubber being derived from monomers selected from the group consisting of (1) conjugated dienes having from 4 to 10 carbon atoms, (2) at least two conjugated dienes having from 4 to 10 carbon atoms, (3) chloroprene, (4) vinyl substituted aromatic compounds having from 7 to 12 carbon atoms and (a) conjugated diene having from 4 to 10 carbon atoms or (b) chloroprene and combinations thereof;
    adding to and blending with said nitrile rubber a crystalline polyamide mixture of a first polyamide having a high melting point and a second polyamide having a lower melting point than said first polyamide, the total amount of said polyamide mixture ranging from about 80 percent to about 20 percent by weight based on said nitrile rubber and the total weight of said polyamides; and,
    mixing and heating said nitrile rubber and said polyamide mixture at a temperature below the melting point of said first polyamide having the higher melting point and above the melting point of said second polyamide having said lower melting point to produce a processable thermoplastic elastomer blend, said mixing temperature ranging from 185° to 220° C.

2. A process according to claim 1 wherein the amount of said high melting polyamide to said total polyamide mixture is at least 15 percent by weight, and wherein the melting point of said lower melting point polyamide is at least 5° C. below said higher melting polyamide.

3. A process according to claim 2 wherein said polyamides are selected from the group consisting of Nylon-6, Nylon-11, Nylon-12, Nylon-6-6, and a polycaprolactam copolymer having a melting point of about 142° C.

4. A process according to claim 3 wherein the amount of said nitrile component of said nitrile rubber ranges from about 15 percent to about 50 percent by weight and wherein the amount of said nitrile rubber ranges from about 50 percent to about 75 percent by weight based upon the total weight of said nitrile rubber and said polyamide mixture, and wherein said mixing temperature is from about 200° C. to about 215° C.

5. A process for preparing blends of a nitrile rubber and a crystalline polyamide mixture, comprising the steps of:
    obtaining a crystalline polyamide mixture of a first polyamide having a high melting point and a second polyamide having a lower melting point than said first polyamide, the total amount of said polyamide mixture ranging from about 80 percent to about 20 percent by weight based on said nitrile rubber and the total weight of said polyamides;
    adding to and blending with said crystalline polyamide mixture a nitrile rubber, the amount of nitrile component in said nitrile rubber ranging from about 10 percent to about 60 percent by weight, said nitrile component being derived from monomers selected from the group consisting of acrylonitrile, methacrylonitrile, vinylidene cyanide, and fumaronitrile, the diene component of said nitrile rubber being derived from monomers selected from the group consisting of (1) conjugated dienes having from 4 to 10 carbon atoms, (2) at least two conjugated dienes having from 4 to 10 carbons, (3) chloroprene, (4) vinyl substituted aromatic compounds having from 7 to 12 carbon atoms and (a) conjugated dienes having from 4 to 10 carbon atoms or (b) chloroprene, and combinations thereof; and mixing and heating said polyamide mixture and said nitrile mixture at a temperature below the melting point of said first polyamide having the higher melting point and above the melting point of said second polyamide having the lower melting point to produce a processable thermoplastic elastomer blend, said mixing temperature ranging from 185° C. to 220° C.

6. A process according to claim 5, wherein said mixing temperature ranges from about 200° to about 215° C.

* * * * *